July 10, 1962 W. A. REICH 3,043,547
HANGER
Filed Feb. 15, 1960
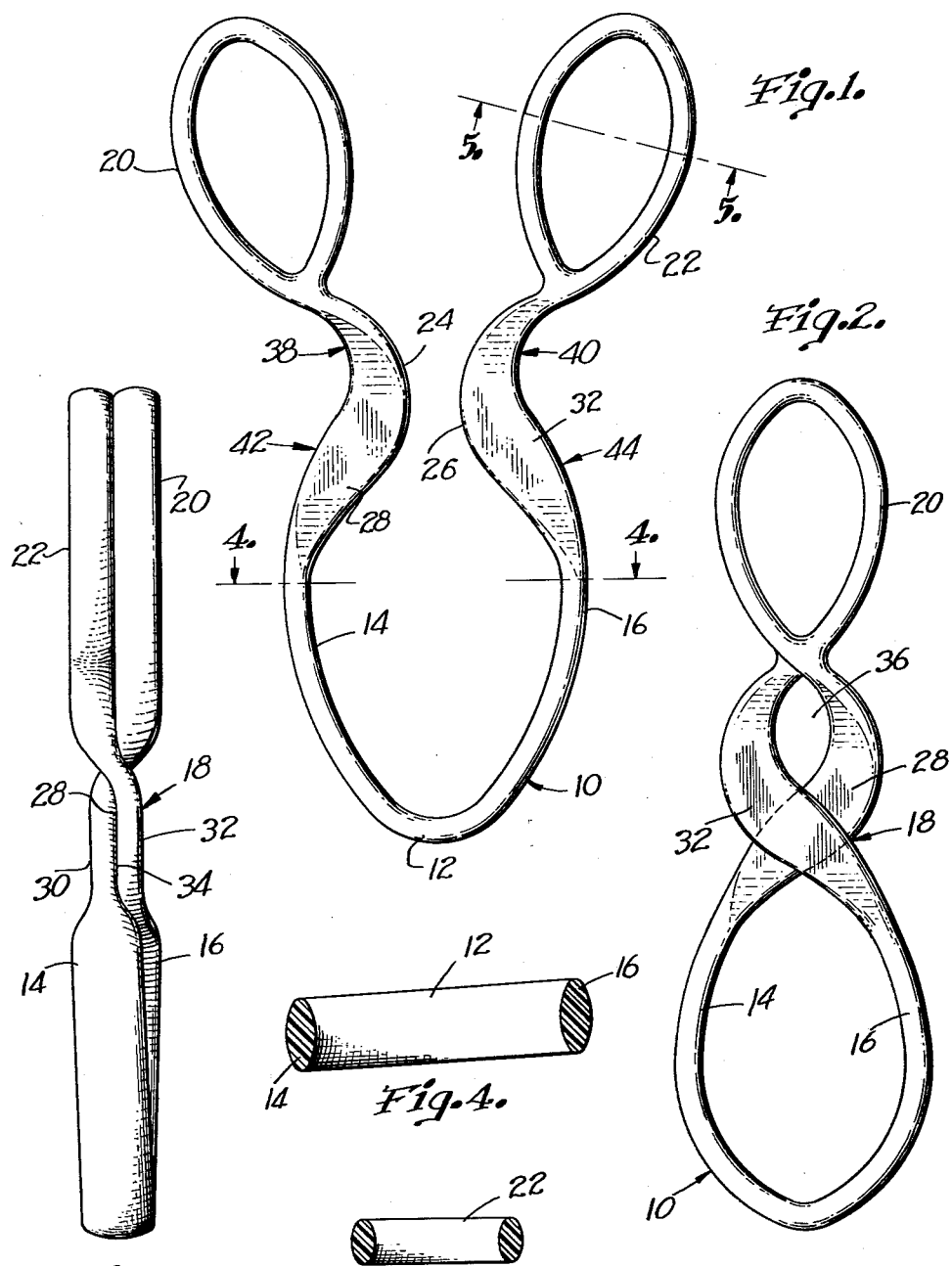
INVENTOR.
Walter A. Reich
BY
Hovey, Schmidt, Johnson & Hovey
ATTORNEYS.

3,043,547
HANGER
Walter A. Reich, Kansas City, Mo., assignor to A. Reich & Sons, Inc., Kansas City, Mo., a corporation of Missouri
Filed Feb. 15, 1960, Ser. No. 8,618
3 Claims. (Cl. 248—317)

This invention relates to a suspension means for facilitating the hanging of meat products and the like and has for its primary object the provision of a light weight, inexpensive, easily manipulated hanger for supplementing hanging appliances heretofore employed such as ropes, cords or the like.

It is the most important object of the present invention to provide a hanger that may not only be looped through an opening provided therefor in the meat or other article to be handled, but which hanger device is formed with interlocking means integral therewith to positively assure that the same will remain in place, attached to the meat product, not only while the latter is hanging from a conveyor or other support but while the meat is being handled.

Another important object of the present invention is to provide a hanger that includes a loop and a pair of eyes which are aligned when the hanger is in use, the loop and the eyes being interconnected by legs, which legs may be uncrossed and spread apart and one of the eyes threaded through the opening in the meat product.

A further object of the present invention is to provide a hanger made of a resilient material and having a loop and a pair of eyes interconnected by crossed legs, which legs each have a reverse bend formed therein to provide a positive interlock between the legs of the loop adjacent the point of crossing thereof and between the eyes and the loop.

This application is a continuation-in-part of my copending application Serial No. 733,175 filed May 5, 1958, now abandoned, and entitled "Hanger."

Important details of construction of the instant invention include the manner in which the cylindrical loop and eyes are tapered to a polygonal cross sectional configuration as the reverse bend areas of the legs are approached and the manner in which the reverse bend areas overlap and interlock to dispose the eyes in alignment subsequent to placing the hanger in a meat product or the like which is to be supported.

In the drawing:
FIGURE 1 is a front elevational view of a hanger made pursuant to the present invention showing the loop thereof attenuated and the eyes spread apart;
FIG. 2 is a front elevational view of the hanger in an operative position showing the eyes in overlapping alignment;
FIG. 3 is a side elevational view of the hanger when the same is in the condition shown in FIG. 2;
FIG. 4 is a sectional view taken on line 4—4 of FIG. 1; and
FIG. 5 is a cross sectional view taken on line 5—5 of FIG. 1.

It is to be preferred that the hanger illustrated in the drawing be made in its entirety from a suitable resilient material chosen from the many synthetic plastics readily available on the present day market and which are well suited for molding the hanger as shown in the accompanying drawing.

There is included as a part of the hanger a loop 10 that is elliptical in the embodiment chosen for illustration, which loop 10 presents an arcuate bight 12 and a pair of legs 14 and 16. Normally when the hanger is placed in use as shown in FIGS. 2 and 3 of the drawing, legs 14 and 16 are crossed at zone 18, namely, at that end of the loop 10 opposite to bight 12.

The free ends of the legs 14 and 16 beyond the zone of crossing 18 are provided with integral elliptical eyes 20 and 22, respectively, such eyes 20 and 22 being in overlapped alignment when the hanger is in the condition shown in FIGS. 2 and 3.

Legs 14 and 16 are each provided with reverse bends 24 and 26, respectively, at a point intermediate loop 10 and eyes 20—22, said reverse bends 24 and 26 being at substantially the zone of crossing 18 of legs 14 and 16 when the hanger is in the condition shown in FIGS. 2 and 3. Loop 10 and eyes 20 and 22 are preferably of cylindrical transverse cross section, as are the portions of legs 14 and 16 next adjacent bight 12. However, as the reverse bends 24 and 26 are approached, legs 14 and 16 are tapered to a polygonal configuration in transverse cross section. Each leg, throughout a portion of its reverse bend area, presents a pair of opposed flattened faces such as 28 and 30 of leg 14 and 32 and 34 of leg 16, it being noted that, as shown in FIGS. 2 and 3, surface 34 of leg 16 is in overlying engagement to surface 28 when the hanger is disposed in an operative position.

When the legs are crossed and the flattened areas of the reverse bends thereof in interengagement as above described, eyes 20 and 22 are retained in their aligned overlapping condition as a result of the interlock between the reverse bend areas 24 and 26 of legs 14 and 16, respectively. When in this condition an open area 36 is formed between the uppermost portions of the reverse bend areas 24 and 26.

As is apparent from the drawing, the reverse bend areas 24 and 26 of legs 14 and 16 are substantially identical in configuration and have at their uppermost portions concave edges 38 and 40, respectively, and at their lowermost portions convex edges 42 and 44, respectively. The reverse bend areas of legs 14 and 16 adjacent concave edges 38 and 40 are polygonal in transverse cross sectional configuration as the cylindrical legs 14 and 16 are tapered in approaching flattened areas 28—30 and 32—34 of legs 14 and 16, respectively. Likewise the reverse bend areas of legs 14 and 16 adjacent convex edges 42 and 44 are polygonal in transverse cross sectional configuration as flattened areas 28—30 and 32—34 are merged into cylindrical legs 14 and 16, respectively.

When the hanger is to be placed in use it will be initially presented in the manner shown in FIG. 1 and the eyes 20 and 22 may be spread further apart as a result of the resiliency of the entire hanger and particularly of bight 12. So spreading eyes 20 and 22, either of the same may be threaded through an opening that is provided in the meat product or the like which is to be suspended and after the hanger has been so disposed in the product the eyes 20 and 22 can be quickly brought into the relationship shown in FIGS. 2 and 3 wherein the same are substantially aligned to permit the receiving of a support through said aligned eyes 20 and 22. Thus when it is desired to so dispose the eyes the leg 16 is moved across the front of leg 14 as viewed in FIG. 1 and eye 22 pushed rearwardly whereby the inherent resiliency of the hanger may urge eye 22 into a position aligned with eye 20 and whereby surfaces 28 and 34 of reverse bends 24 and 26 are in overlapped engagement. It will be noted that when in this operative position the eyes 20 and 22 are disposed in a plane spaced from their corresponding legs 14 and 16 and the areas 28 and 34 are in tight interlocking engagement as a result of the resiliency of the hanger.

Manifestly, when in the operative position shown in FIGS. 2 and 3 the overlapped eyes 20 and 22 will accommodate meat hooks or other devices such as those normally employed on trolley wheels of an overhead conveyor. Notable in FIGS. 2 and 3, and as above pointed out, is the fact that the resiliency of the material from which the hanger is formed holds legs 14 and 16 interlocked at zone 18 and that even while the material suspended from the hanger (not shown) is being handled unsupported by the hanger the hanger will not become displaced from the opening in the material to be handled. When eyes 20 and 22 are received by a hook or suspended from an overhead conveyor, for example, the two eyes 20 and 22 will be additionally held against relative movement by the hook itself which is threaded therethrough. Thus through the use of the present invention the time-consuming task of threading and tying a rope or cord into proper relationship with the material to be suspended is eliminated, the danger of breakage of the suspension means and therefore falling of the material is reduced, there is no danger of knots becoming untied and in all respects the hanger is attractive, sanitary and capable of supporting a substantial amount of weight in a safe manner.

Having thus described the invention what is claimed as new and desired to be secured by Letters Patent is:

1. A hanger comprising a loop having a pair of crossed legs, each provided with a closed eye formed by the leg being looped and joined to itself, the eyes being in overlapped alignment when the legs are crossed, each of said legs having a reverse bend therein at substantially the point of crossing, the area of the reverse bend of each leg being flattened throughout a substantial part thereof whereby to permit overlying, face-to-face engagement of said legs at the point of crossing thereof, the loop being of resilient material permitting disengagement of said legs and spreading the same apart.

2. A hanger comprising a loop having a pair of crossed legs, each provided with a closed eye formed by the leg being looped and joined to itself, the eyes being in overlapped alignment and spaced from the plane of their corresponding legs when the legs are crossed, each of said legs having a reverse bend therein between the loop and its respective eye, said loop and said eyes being cylindrical in cross section, said reverse bend areas being flattened throughout a substantial part thereof, the portions of said reverse bend areas adjacent said loop being in overlying face-to-face engagement when the legs are crossed whereby to retain said eyes in overlapped alignment, the loop being of resilient material permitting disengagement of said portions and spreading apart of the eyes.

3. A hanger comprising a loop having a pair of legs, each of said legs having a closed eye formed at the free end thereof, said hanger being of resilient material whereby to permit crossing and uncrossing of said legs, each of said legs having a reverse bend therein between said loop and its respective eye, the loop and the eyes being cylindrical in cross section, the reverse bends being flattened throughout a substantial part thereof, said reverse bend areas being in engagement when said legs are crossed whereby to retain said eyes in overlapped alignment.

References Cited in the file of this patent
UNITED STATES PATENTS

| | | |
|---|---|---|
| 249,947 | Judd | Nov. 22, 1881 |
| 1,892,678 | McIntyre | Jan. 3, 1933 |
| 2,653,844 | Detwiler | Sept. 29, 1953 |
| 2,766,061 | Copper | Oct. 9, 1956 |